United States Patent
Raj et al.

(10) Patent No.: US 9,569,310 B2
(45) Date of Patent: Feb. 14, 2017

(54) SYSTEM AND METHOD FOR A SCALABLE CRASH-CONSISTENT SNAPSHOT OPERATION

(71) Applicant: NetApp, Inc., Sunnyvale, CA (US)

(72) Inventors: Bipul Raj, Bangalore (IN); Gaurav Makkar, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 179 days.

(21) Appl. No.: 13/778,703

(22) Filed: Feb. 27, 2013

(65) Prior Publication Data

US 2014/0244952 A1 Aug. 28, 2014

(51) Int. Cl.
*G06F 11/14* (2006.01)

(52) U.S. Cl.
CPC ....... *G06F 11/1448* (2013.01); *G06F 11/1466* (2013.01); *G06F 2201/82* (2013.01); *G06F 2201/84* (2013.01)

(58) Field of Classification Search
CPC .................................................. G06F 11/1456
USPC ......................................................... 711/162
See application file for complete search history.

(56) References Cited

U.S. PATENT DOCUMENTS

| | | | |
|---|---|---|---|
| 6,081,875 A | | 6/2000 | Clifton et al. |
| 7,685,378 B2* | | 3/2010 | Arakawa et al. ............. 711/154 |
| 8,205,049 B1* | | 6/2012 | Armangau et al. ........... 711/162 |
| 2004/0268067 A1* | | 12/2004 | Yamagami .................... 711/159 |
| 2005/0256859 A1* | | 11/2005 | Keohane ........... G06F 17/30067 |
| 2007/0067586 A1 | | 3/2007 | Mikami |
| 2009/0172417 A1* | | 7/2009 | Mikami et al. ................ 713/193 |
| 2009/0210458 A1* | | 8/2009 | Glover ................ G06F 11/1451 |
| 2009/0254693 A1 | | 10/2009 | Karamanolis |
| 2011/0246423 A1* | | 10/2011 | Jess ..................... G06F 11/1466 707/639 |
| 2013/0060940 A1* | | 3/2013 | Koponen ............ H04L 12/4633 709/225 |

OTHER PUBLICATIONS

International Search Report for Application No. PCT/US2014/018485 mailed on May 30, 2014, 3 pages.
EP Search Report cited in EP Application No. 14757537.7 dated Nov. 4, 2016, 6 pgs.

* cited by examiner

*Primary Examiner* — Midys Rojas
*Assistant Examiner* — Jane Wei
(74) *Attorney, Agent, or Firm* — Cooper Legal Group, LLC

(57) ABSTRACT

Described herein is a system and method for a scalable crash-consistent snapshot operation. Write requests may be received from an application and a snapshot creation request may further be received. Write requests received before the snapshot creation request may be associated with pre-snapshot tags and write requests received after the snapshot creation request may be associated with post-snapshot tags. Furthermore, in response to the snapshot creation request, logical interfaces may begin to be switched from a pre-snapshot configuration to a post-snapshot configuration. The snapshot may then be created based on the pre-snapshot write requests and the post-snapshot write requests may be suspended until the logical interfaces have switched configuration.

25 Claims, 10 Drawing Sheets

| Write Request | Pre-snapshot | Post-snapshot |
|---|---|---|
| 1 | 1 | 0 |
| 2 | 1 | 0 |
| 3 | 0 | 1 |
| 4 | 0 | 1 |
| ... | ... | ... |

FIG. 10

SYSTEM AND METHOD FOR A SCALABLE CRASH-CONSISTENT SNAPSHOT OPERATION

FIELD

Embodiments of the present disclosure relate to storage systems, and in particular, to a scalable crash-consistent snapshot operation.

BACKGROUND

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives (or flash-based devices) organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize the information stored on volumes as a hierarchical structure of storage objects, such as files and logical units (LUs). A known type of file system is a write-anywhere file system that does not overwrite data on disks. An example of a write-anywhere file system that is configured to operate on a storage system is the Write Anywhere File Layout (WAFL®) file system available from NetApp, Inc. Sunnyvale, Calif.

The storage system may be further configured to allow many servers to access storage objects stored on the storage system. In this model, the server may execute an application, such as a database application, that "connects" to the storage system over a computer network, such as a point-to-point link, shared local area network (LAN), wide area network (WAN), or virtual private network (VPN) implemented over a public network such as the Internet. Each server may request the data services of the storage system by issuing access requests (read/write requests) as file-based and block-based protocol messages (in the form of packets) to the system over the network.

A plurality of storage systems may be interconnected to provide a storage system architecture configured to service many servers. In some embodiments, the storage system architecture provides one or more aggregates, each aggregate comprising a set of one or more storage devices (e.g., disks). Each aggregate may store one or more storage objects, such as one or more volumes. The aggregates may be distributed across a plurality of storage systems interconnected as a cluster. The storage objects (e.g., volumes) may be configured to store content of storage objects, such as files and logical units, served by the cluster in response to multi-protocol data access requests issued by servers.

Each storage system (node) of the cluster may include (i) a storage server (referred to as a "D-blade") adapted to service a particular aggregate or volume and (ii) a multi-protocol engine (referred to as an "N-blade") adapted to redirect the data access requests to any storage server of the cluster. In the illustrative embodiment, the storage server of each storage system is embodied as a disk element (D-blade) and the multi-protocol engine is embodied as a network element (N-blade). The N-blade receives a multi-protocol data access request from a client, converts that access request into a cluster fabric (CF) message and redirects the message to an appropriate D-blade of the cluster.

The storage systems of the cluster may be configured to communicate with one another to act collectively to increase performance or to offset any single storage system failure within the cluster. The cluster provides data service to servers by providing access to a shared storage (comprising a set of storage devices). Typically, servers will connect with a storage system of the cluster for data-access sessions with the storage system. During a data-access session with a storage system, a server may submit access requests (read/write requests) that are received and performed by the storage system.

Each storage system may be associated with one or more volumes (e.g., data volumes stored on storage devices). A snapshot operation may be performed to create a read-only copy of the volumes. The snapshot may be utilized by a file system to create a point in time view or image of a consistency group comprising one or more volumes that are stored on one or more storage devices. However, in conventional snapshot operations, incoming write requests to the volumes may be fenced or suspended for a significant period of time. For example, write requests to volumes subject to the snapshot may be suspended until the snapshot operation has finished or until a snapshot operation for a corresponding volume has been finished. As such, write requests for a volume may be fenced or suspended for a significant period of time and such a period of time may result in an application issuing the write requests to time out (due to not being able to execute write requests). Furthermore, the fencing or suspending of write requests to a volume may be dependent on the specifics of the volume and/or application. For example, the amount of time that a volume may be fenced may be dependent upon the data set size of the volume. As such, the fencing or suspension time period may be variable (e.g., not deterministic) as it may vary based on the volume and application.

Thus, an effective method and system for creating a crash-consistent snapshot operation of a consistency group is needed. For example, a system and method for creating a crash-consistent snapshot operation that is scalable and deterministic to address application timeout issues is needed.

SUMMARY

The embodiments described herein provide a system and method for a snapshot operation that is scalable and deterministic. In some embodiments, the snapshot operation is performed on one or more volumes stored on one or more primary storage devices to create a read-only copy of the volumes. In the same or alternative embodiments, the snapshot operation may be performed to create a snapshot of a consistency group that comprises one or more volumes and is used by an application. For example, the application may issue write requests to modify data of the volumes that comprise the consistency group. In some embodiments, the application may issue the write requests at various points in time. For example, the application may issue write requests to modify or write data to the volumes of the consistency group before a snapshot operation has been requested or initiated and the application may also issue write requests to modify or write data to the volumes of the consistency group after the snapshot operation has been requested or initiated. As such, write requests issued from the application may be considered pre-snapshot (i.e., issued by the application before the request for the snapshot) or post-snapshot (i.e., issued by the application after the request for the snapshot).

In some embodiments, to create a crash-consistent copy of the snapshot, the request for the snapshot of the consistency group may result in the switching (i.e., flipping) of a configuration of a logical or network interface in a distributed storage system environment. In the same or alternative embodiments, the network interface may comprise a component (e.g., a storage server or server system or a software layer or interface running on network hardware) that is associated with a data path (e.g., a transmission path from an application issuing write requests to a volume subject to the write request) that comprises the primary storage devices storing volumes of the consistency group. For example, the logical or network interface may comprise a configuration to label or tag incoming writes requests issued from the application to write data stored on the volumes of the consistency group. The logical or network interface may comprise a first configuration to label or tag incoming write requests with a pre-snapshot tag (e.g., a pre-snapshot configuration) and a second configuration to label or tag incoming write requests with a post-snapshot tag (e.g., a post snap-shot configuration). In some embodiments, the configuration of the logical or network interface may be switched from the pre-snapshot configuration to the second snapshot configuration in response to a request to create a snapshot of the consistency group. As such, the logical or network interface may switch from associating incoming write requests from the application with a pre-snapshot tag to associating subsequent incoming write requests from the application with a post-snapshot tag.

In some embodiments, the snapshot of the consistency group may be created based on the write requests associated with the pre-snapshot tag. As such, write requests associated with the post-snapshot tag may not be reflected in the snapshot of the consistency group. Furthermore, while write requests associated with the pre-snapshot tag may be executed to modify or write data to the volumes immediately, write requests associated with a post-snapshot tag may be suspended for a short period of time. For example, the write requests associated with the post-snapshot tag may be suspended (e.g., prevented from executing and thus modifying the volumes of the consistency group) until all relevant logical or network interfaces have completed switching from the pre-snapshot configuration to the post-snapshot configuration in response to the request to create the snapshot of the consistency group. Once all of the relevant logical or network interfaces have switched from the pre-snapshot configuration to the post-snapshot configuration, then the write requests associated with the post-snapshot tag will be executed (e.g., no longer suspended).

As such, the suspending of any write requests (e.g., the write requests associated with the post-snapshot tag) is dependent upon a time for the logical or network interfaces to switch configuration from a pre-snapshot configuration to a post-snapshot configuration. Since the time may be known since the switching of the configuration of the logical or network interfaces is not dependent upon variable data volumes, such a suspension time may be deterministic as opposed to non-deterministic. Furthermore, since the snapshot is only created with write requests associated with a pre-snapshot tag, the snapshot that is created may be crash-consistent.

BRIEF DESCRIPTION OF THE DRAWINGS

FIG. 10 shows an exemplary snapshot data structure in accordance with some embodiments.

DETAILED DESCRIPTION

Figure 1:
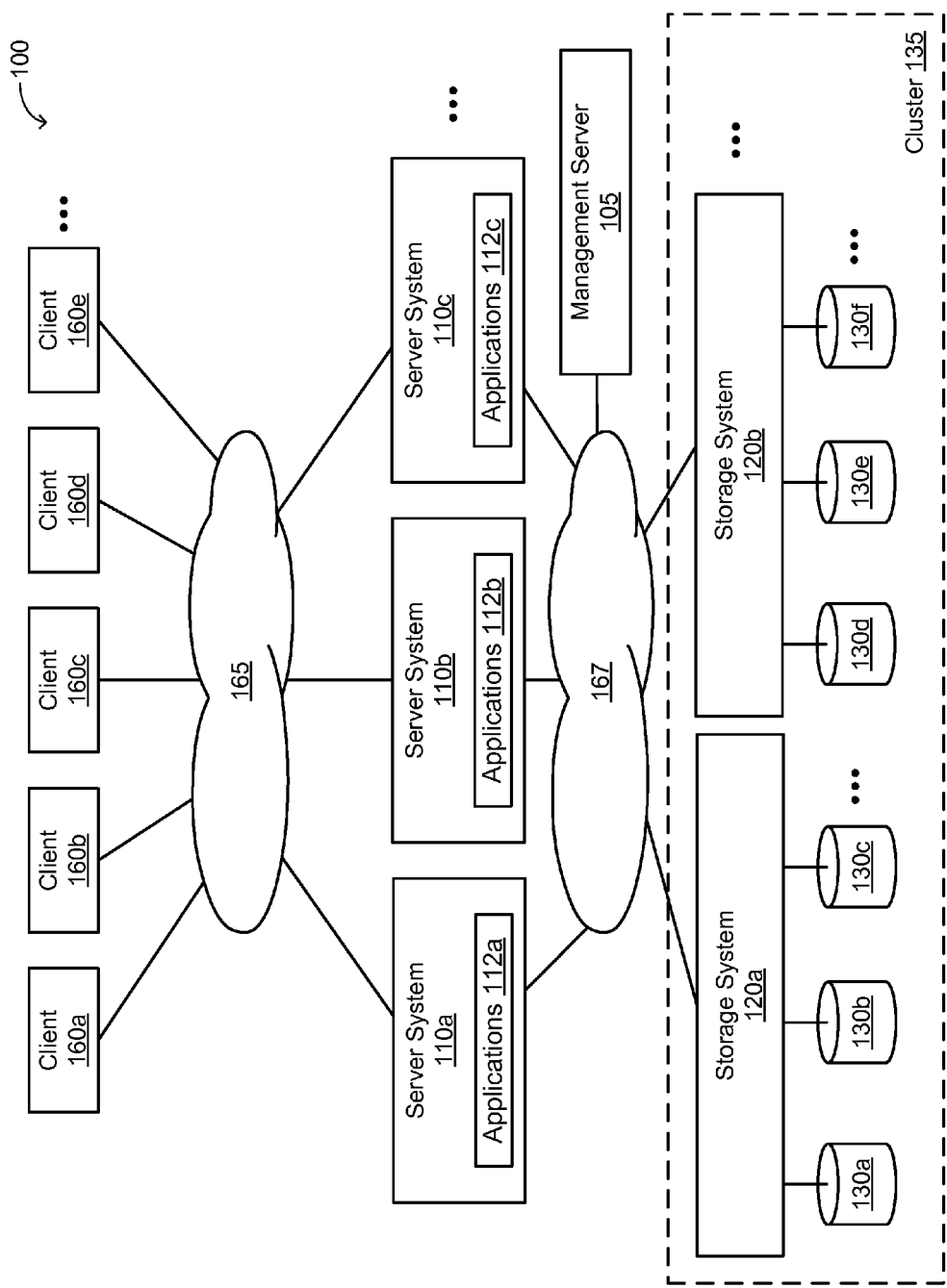
FIG. 1 is a schematic diagram of an exemplary distributed storage system environment in which some embodiments operate.

In the following description, numerous details and alternatives are set forth for purpose of explanation. However, one of ordinary skill in the art will realize that embodiments can be practiced without the use of these specific details. In other instances, well-known structures and devices are shown in block diagram form to not obscure the embodiments with unnecessary detail.

The description that follows is divided into three sections. Section I contains terms used herein. Section II describes a cluster storage system environment in which some embodiments operate. Section III describes a system and method for a scalable crash-consistent snapshot operation.

I. Terms

Cluster storage system: As used herein, a cluster storage system may comprise a set of one or more storage systems. In some embodiments, the cluster may comprise one storage system. As such, the terms "cluster" and "storage system" may sometimes be used interchangeably. In other embodiments, a cluster comprises a plurality of storage systems.

Hypervisor: As used herein, a hypervisor may refer to a virtual machine manager that allows multiple operating systems or applications to run concurrently on a host computer. A hypervisor may be referred to as a 'host.' In some embodiments, the hypervisor may present to a guest operating system a virtual operating system and manages the execution of the guest operating system. In some embodiments, multiple instances of a plurality of operating systems may share virtualized hardware (e.g., storage) resources. A hypervisor may be stored on a storage system or server.

Snapshot: As used herein, a snapshot comprises a feature that creates an online, read-only copy of a file system. The snapshot may protect against accidental deletions or modifications of files without duplicating file contents. In some embodiments, a snapshot is utilized to create a point in time view or image of a base volume or volumes. When a file is changed, the snapshot copy may still point to the storage device blocks where the file existed before it was modified and changes are written to new storage device blocks. As data is changed in the snapshot copy, the original data blocks stay associated with the snapshot copy rather than getting marked for reuse.

Logical interface: As used herein, a logical interface may comprise a network interface. In some embodiments, the logical interface comprises a data path of the cluster storage system. For example, the logical interface may comprise a network component (e.g., a server system, storage system, primary storage device, software application layer or protocol running on the afore mentioned systems) in a particular data path of the cluster storage system. In some embodiments, the logical interface may be identifiable or associated with an Internet protocol (IP) address. In the same or alternative embodiments, write requests may be issued by using the IP address of the logical interface to write to a volume stored on a primary storage device in the data path associated with the logical interface. As such, the logical interface may comprise a network component of the cluster storage system. In some embodiments, a write request issued from an application to a volume stored on a primary storage device must be transmitted through and/or managed by a logical interface.

II. Cluster Storage System Environment

FIG. 1 is a block diagram of an exemplary virtual server environment 100 in which some embodiments operate. The environment 100 may comprise a set of one or more server systems 110 (e.g., server systems 110a, 110b, 110c, etc.) connected to one or more client systems 160 (e.g., client systems 160a, 160b, 160c, 160d, 160e, etc.) via a network 165 and one or more storage systems 120. The server systems 110 may each access one or more storage systems 120 (e.g., storage systems 120a, 120b, etc.) that are connected to the server systems 110 via a network 167. The one or more storage systems 120 comprise a cluster storage system 135. Each storage system 120 in the cluster 135 may comprise a set of primary storage devices 130 (e.g., storage devices 130a, 130b, 130c, etc.) for storing client data, the storage devices 130 of the cluster 135 comprising a shared storage of the storage system 120. Note that the server systems 110 are also connected to each other (e.g., via network 167) for communicating with each other (e.g., for working collectively to provide data-access service to the client systems 160 and for collectively hosting a plurality of virtual machines as described herein).

A client system 160 may comprise a computer system that may interact with a server system 110 for submitting read/write access requests and for receiving or transmitting data from or to the server systems 110 over the network 165. In a virtual server environment, a client system 160 may interact over the network 165 with one or more virtual machines (VMs) executing on a server system 110 for submitting read/write access requests and for receiving or transmitting data from or to the storage system 120 over the network 167.

A server system 110 may comprise a computer system that may execute one or more applications 112 (e.g., applications 112a, 112b, etc.) that interacts with the storage systems 120 and client systems 160 for receiving read/write access requests and receiving or transmitting data over the network 167 and the network 165. In some embodiments, a server system 110 may comprise a chassis hosting multiple instances of server systems 110, each server system 110 hosting multiple client systems embodied as virtual machines. The network 167 and/or subnets of networks 167 may be physically embodied within such a chassis.

An application 112 executing on a server system 110 may provide data-access services to client systems 160 by transmitting and processing access requests for data from the storage system(s) 120. In turn, an application 112 utilizes the services of the storage system 120 to access, store, and manage data in a set of storage devices 130. As such, a server system 110 may execute one or more applications 112 that submit access requests for accessing particular storage objects on the storage devices. Each application 112 may submit access requests for accessing particular storage objects on the storage systems of the cluster 135 and the cluster 135 may perform the received requests on the storage objects. An application 112 may comprises a non-virtual machine based application, such as a typical email exchange application or database application. In other embodiments, an application 112 may comprise a virtual machine-based application, such as a virtual machine (discussed below).

A storage system 120 may be coupled locally to a server system 110 over a network 167 such as a local area network (LAN), an Ethernet subnet, a PCI or PCIe subnet, a switched PCIe subnet, a wide area network (WAN), a metropolitan area network (MAN), the Internet, or the like. In some embodiments, a server system 110 may comprise a chassis hosting multiple instances of server systems 110 within a single chassis (e.g., a blade server chassis), with each instance of a server system 110 in communication with each other instance of a server system 110 in the chassis via network 167.

Interaction between the server systems 110 and the storage system(s) 120 can enable the provision of storage services. That is, the server systems 110 may request the services of the storage system(s) 120 (by submitting read/write access requests), and the storage system(s) 120 may respond to read/write access requests of the server systems 110 by receiving or transmitting data to the server systems 110 over the network 167 (e.g., by exchanging data packets through a connection over the network 167). In some embodiments, a management server 105 may facilitate the interaction between the server systems 110 and the storage systems 120 or the interaction between any components of the virtual server environment 100.

Communications between a storage system 120 and any of server systems 110 are typically embodied as packets sent over the computer network 167. A server system 110 may send an access request (a read/write access request) to the storage system 120 for accessing particular data stored on the storage system. The server system 110 may request the services of the storage system 120 by issuing storage-access protocol messages formatted in accordance with a conventional storage-access protocol for accessing storage devices (such as CIFS, NFS, etc.). Access requests (e.g., read/write access requests) may be implemented by issuing packets using file-based access protocols—such as the Common Internet File System (CIFS) protocol or Network File System (NFS) protocol—over the Transmission Control Protocol/Internet Protocol (TCP/IP) when accessing data in the form of files and directories. Alternatively, the server system 110 may issue access requests by issuing packets using block-based access protocols—such as the Fibre Channel Protocol (FCP), Fibre Channel over Ethernet (FCoE), or Internet Small Computer System Interface (iSCSI) Storage Area Network (SAN) access—when accessing data in the form of blocks.

Each application 112 executing on a server system 110 may utilize services of the cluster 135 to store and access its data. The storage system 120 may comprise a computer system that stores data in a set of one or more storage devices 130 as storage objects. A storage device 130 may comprise writable storage device media such as storage devices, video tape, optical devices, DVD, magnetic tape, flash memory, Magnetic Random Access Memory (MRAM), Phase Change RAM (PRAM), or any other similar media adapted to store information (including data and parity information).

As known in the art, a storage device 130 may comprise storage objects comprising one or more storage volumes, where each volume has a file system implemented on the volume. A file system implemented on the storage devices 130 may provide multiple directories in a single volume, each directory containing zero or more filenames. A file system provides a logical representation of how data (files) are organized on a volume where data (files) are represented as filenames that are organized into one or more directories. Examples of common file systems include New Technology File System (NTFS), File Allocation Table (FAT), Hierarchical File System (HFS), Universal Storage Device Format (UDF), UNIX® file system, and the like. For the Data ONTAP® storage operating system (available from NetApp, Inc. of Sunnyvale, Calif.) which may implement a Write Anywhere File Layout (WAFL®) file system, there is typically a WAFL file system within each volume, and within a WAFL file system, there may be one or more logical units (LUs).

Figure 2:
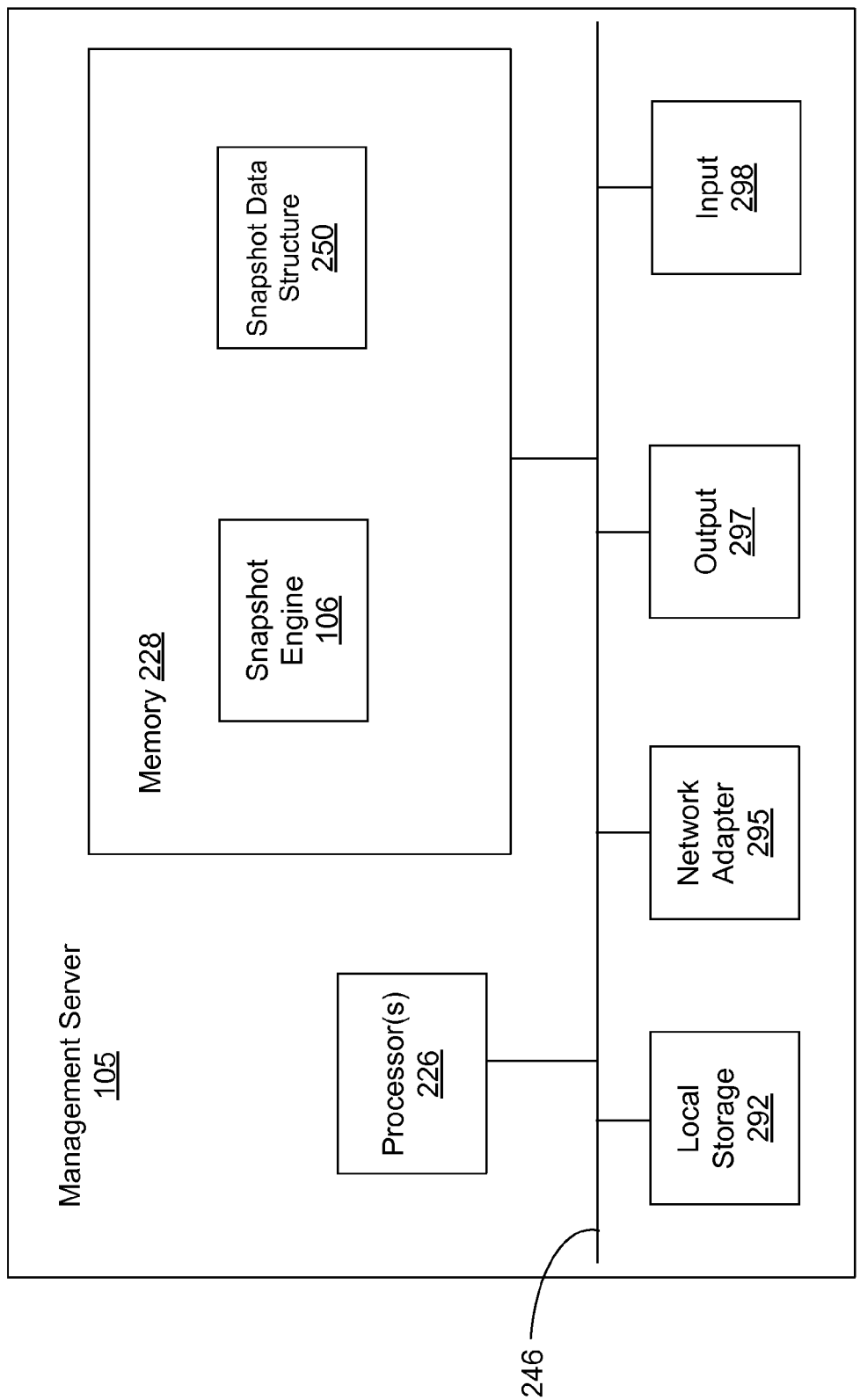
FIG. 2 is a schematic block diagram of an exemplary management server that may be employed in the storage system environment.

FIG. 2 is a schematic block diagram of an exemplary management server 105 that may be employed in the storage system environment. The management server 105 comprises server processor(s) 226, server memory 228, a server local storage 292, a server network adapter 295, an output component 297, and an input component 298 coupled by a bus 246.

The server processors 226 are the central processing units (CPUs) of the management server 105 and, thus, control the overall operation of the management server 105. Server processors 226 may include one or more programmable general-purpose or special-purpose microprocessors, digital signal processors (DSPs), programmable controllers, application specific integrated circuits (ASICs), programmable logic devices (PLDs), or the like, or a combination of such devices. The server network adapter 295 comprises a plurality of ports adapted to couple the management server 105 to one or more other computer systems (such as servers 110 or storage systems 100) over point-to-point links, wide area networks, virtual private networks implemented over a public network (Internet) or a shared local area network. The server network adapter 295 thus may comprise the mechanical, electrical and signaling circuitry needed to connect the storage system to the network.

The output component 297 may be of any type generally used by a computer system to provide information to an end user (e.g., administrator). For example, the output component 297 could include a monitor, an audio speaker, or an alphanumeric display. Similarly, the input component 298 may be of any type that allows an end user to provide input into a computer system. For example, the input component 298 may be a keyboard, a mouse, or a speech recognition system. In some embodiments, the input component 298 may be used by an administrator to initiate the creation of a snapshot of a consistency group.

Server memory 228 can be a random access memory (RAM), a read-only memory (ROM), or the like, or a combination of such devices. It will be apparent to those skilled in the art that other processing and memory means, including various computer readable media, may be used for storing and executing program instructions pertaining to the embodiments described herein. Server memory 228 comprises storage locations that are addressable by the processor 226 and adapters for storing software program code, such as software described herein. The server processor 226 and server adapters may, in turn, comprise processing elements and/or logic circuitry configured to execute the software code. Such software code may include a snapshot engine 106 and snapshot data structure 250. In some embodiments, the various modules may configure hardware components of the management server to produce a snapshot engine 106 and snapshot data structure 250.

Server local storage 292 is a storage device that stores data needed by the snapshot engine 106 and snapshot data structure 250 for performing the embodiments described herein. Such data may include write requests information. The management server 105 loads data stored on the server local storage 292 into server memory 228 from which they are accessed by server processors 226. The server local storage 292 may also store data produced by the snapshot engine 106 and snapshot data structure 250 upon performing the embodiments described herein. For example, such data may include write requests and associated tags for the write requests.

In some embodiments, the snapshot engine 106 and snapshot data structure 250 for performing the embodiments described herein reside and execute on the management server 105 which is external and separate from the server 110 and storage systems 100. In other embodiments, the snapshot engine 106 and snapshot data structure 250 may be distributed and reside and execute on one or more servers 110 and/or one or more storage systems 100.

Figure 3:
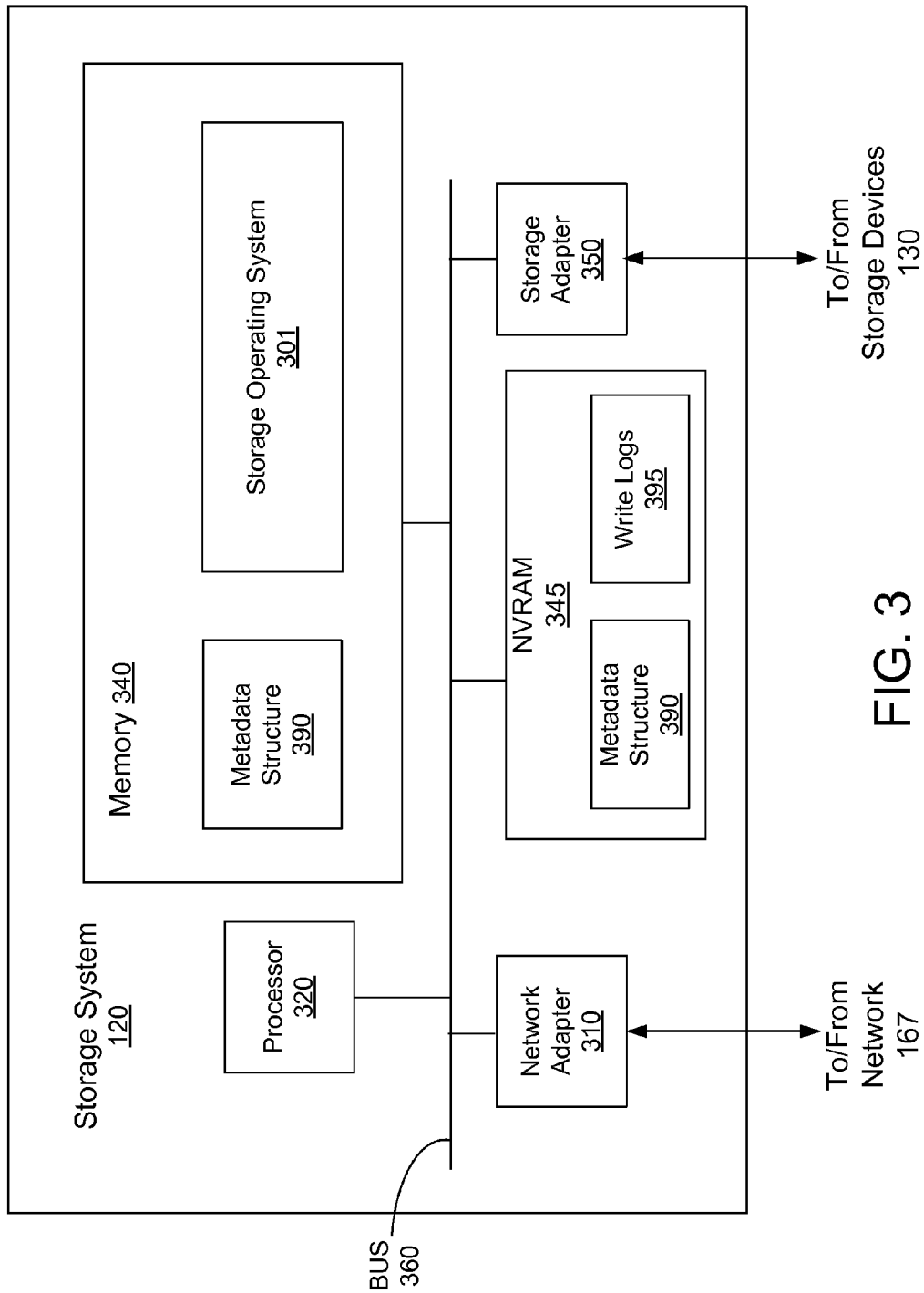
FIG. 3 is a schematic block diagram of an exemplary storage system that may be employed in the storage system environment.

FIG. 3 is a schematic block diagram of an exemplary storage system 120 that may be employed in the storage system environment of FIG. 1. Those skilled in the art will understand that the embodiments described herein may apply to any type of special-purpose computer (e.g., storage system) or general-purpose computer, including a stand-alone computer, embodied or not embodied as a storage system. To that end, storage system 120 can be broadly, and alternatively, referred to as a computer system. Moreover, the teachings of the embodiments described herein can be adapted to a variety of storage system architectures including, but not limited to, a network-attached storage environment, a storage area network and disk assembly directly-attached to a server computer. The term "storage system" should, therefore, be taken broadly to include such arrangements.

The storage system 120 comprises a network adapter 310, a processor 320, a memory 340, a non-volatile random access memory (NVRAM) 345, and a storage adapter 350 interconnected by a system bus 360. The network adapter 310 comprises the mechanical, electrical and signaling circuitry needed to connect the storage system 120 to a server system 110 over a computer network 167. The storage system may include one or more network adapters. Each network adapter 310 has a unique IP address and may provide one or more data access ports for server systems 110 to access the storage system 120 (where the network adapter accepts read/write access requests from the server systems 110 in the form of data packets). In some embodiments, the storage adapter 350 and the network adapter 310 may comprise a single unified target adapter (UTA) that may be used to perform the functionality of both the storage adapter 350 and the network adapter 310.

The memory 340 comprises storage locations that are addressable by the processor 320 and adapters for storing software program code and data. The memory 340 may comprise a form of random access memory (RAM) that is generally cleared by a power cycle or other reboot operation (e.g., it is a "volatile" memory). In other embodiments, however, the memory 340 may comprise a non-volatile form of memory that does not require power to maintain information. The processor 320 and adapters may, in turn, comprise processing elements and/or logic circuitry configured to execute the software code and manipulate the data stored in the memory 340.

The storage system 120 may also include a NVRAM 345 that may be employed as a backup memory that ensures that the storage system 120 does not "lose" received information, e.g., CIFS and NFS requests, in the event of a system shutdown or other unforeseen problem. The NVRAM 345 is typically a large-volume solid-state memory array having either a back-up battery, or other built-in last-state-retention capabilities (e.g. a FLASH memory), which holds the last state of the memory in the event of any power loss to the array. Therefore, even if an access request stored in memory 340 is lost or erased (e.g., due to a temporary power outage) it still may be recovered from the NVRAM 345.

The processor 320 executes a storage operating system application 301 of the storage system 120 that functionally organizes the storage system by, inter alia, invoking storage operations in support of a file service implemented by the storage system. In some embodiments, the storage operating system 301 comprises a plurality of software layers that are executed by the processor 320. Portions of the storage operating system 300 are typically resident in memory 340. It will be apparent to those skilled in the art, however, that other processing and memory means, including various computer readable media, may be used for storing and executing program instructions pertaining to the storage operating system 300.

The storage adapter 350 cooperates with the storage operating system 301 executing on the storage system 120 to access data requested by the server system 110. The data may be stored on the storage devices 130 that are attached, via the storage adapter 350, to the storage system 120 or other node of a storage system as defined herein. The storage adapter 350 includes input/output (I/O) interface circuitry that couples to the storage devices 130 over an I/O interconnect arrangement, such as a conventional high-performance, Fibre Channel serial link topology. In response to an access request received from a server system 110, data may be retrieved by the storage adapter 350 and, if necessary, processed by the processor 320 (or the adapter 350 itself) prior to being forwarded over the system bus 360 to the network adapter 310, where the data may be formatted into a packet and returned to the server system 110.

In an illustrative embodiment, the storage devices 130 may comprise disk devices that are arranged into a plurality of volumes, each having a file system associated therewith. In some embodiments, the storage devices 130 comprise disk devices that are configured into a plurality of RAID (redundant array of independent disks) groups whereby multiple storage devices 130 are combined into a single logical unit (i.e., RAID group). In a typical RAID group, storage devices 130 of the group share or replicate data among the disks that may increase data reliability or performance. The storage devices 130 of a RAID group are configured so that some disks store striped data and at least one disk stores separate parity for the data, in accordance with a preferred RAID-4 configuration. However, other configurations (e.g. RAID-5 having distributed parity across stripes, RAID-DP, etc.) are also contemplated. A single volume typically comprises a plurality of storage devices 130 and may be embodied as a plurality of RAID groups.

The organization of a storage operating system 300 for the exemplary storage system 120 is now described briefly. However, it is expressly contemplated that the principles of the embodiments described herein can be implemented using a variety of alternative storage operating system architectures. As discussed above, the term "storage operating system" as used herein with respect to a storage system generally refers to the computer-executable code operable on a storage system that implements file system semantics (such as the above-referenced WAFL®) and manages data access. In this sense, Data ONTAP® software is an example of such a storage operating system implemented as a microkernel. The storage operating system can also be implemented as an application program operating over a general-purpose operating system, such as UNIX® or Windows®, or as a general-purpose operating system with configurable functionality.

III. Systems and Methods for a Scalable Crash-Consistent Snapshot Operation

Figure 4:
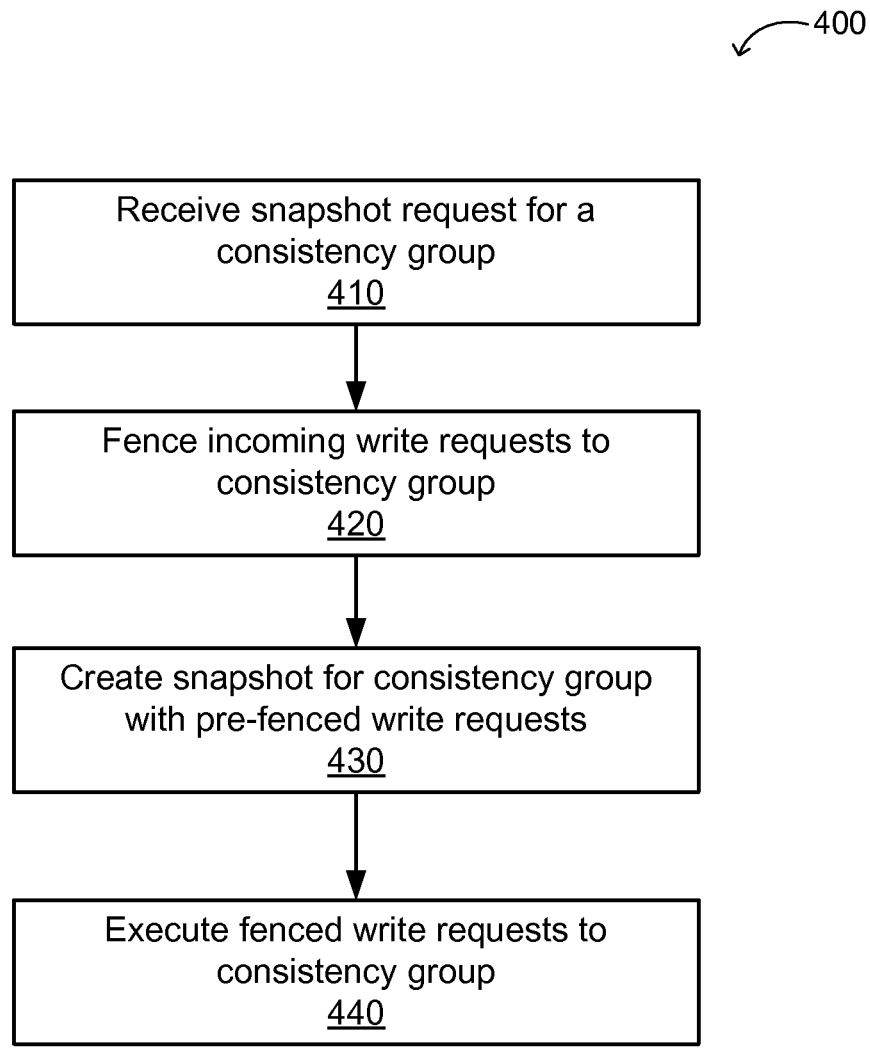
FIG. 4 is a flowchart of a technique to create a snapshot of a consistency group in accordance with some embodiments.

FIG. 4 is a flowchart of a technique 400 to create a snapshot of a consistency group in accordance with some embodiments. In general, the technique 400 may be used to create a snapshot of volumes stored on one or more primary storage devices (e.g., primary storage device 130) based on write requests to the volumes associated with the consistency group. In some embodiments, the storage system 100 and/or the snapshot engine 106 of the management server 105 may perform the technique 400. The technique 400 is described in relation to FIGS. 1-3, which conceptually illustrates the steps of the technique 400. In some embodiments, the technique 400 may create the snapshot from volumes stored on one or more primary storage devices with human initiation, interaction, or intervention. In some embodiments, particular steps of the technique 400 may be performed automatically, without human initiation, interaction, or intervention, while other steps of the technique 400 may be performed with human interaction. For example, in some embodiments, the steps of the technique 400 may be initiated when a user of an application (e.g., application 112) initiates a snapshot creation request.

In some embodiments, some of the steps of technique 400 are performed or caused to be performed by a storage operating system 301 of a storage system 100. The storage operating system 301 may be configured to operate in conjunction with other software modules of the storage system 100, server system 110, and software modules of the storage operating system 301 to collectively perform the embodiments described herein.

As shown in FIG. 4, the technique 400 may receive (at step 410) a snapshot request for a consistency group. For example, a user of an application (e.g., application 112) may submit or issue a request or direction for a snapshot to be created for a consistency group (e.g., one or more volumes used by the application 112 to store data blocks where the one or more volumes are stored on one or more primary storage devices 130). In some embodiments, the snapshot engine 106 may receive the request for the creation of the snapshot for the consistency group. The technique 400 may further fence (at block 420) incoming write requests to the consistency group. For example, write requests (e.g., from application 112 for storing or modifying data blocks of volumes stored on primary storage devices 130) received or issued after the snapshot request may be suspended such that the write requests will not be executed to associated volumes. As such, changes or additions to data blocks stored on the volumes subject to the snapshot request and from the write requests after the snapshot creation request will not be performed and/or executed while the write requests are fenced and/or suspended. In some embodiments, the snapshot engine 106 and/or server system and storage system may perform operations necessary to suspend and/or fence the write requests. As such, write requests comprising changes to data blocks associated with volumes may be halted or prevented for executing for a period of time.

As shown in FIG. 4, the technique 400 may further create (at step 430) a snapshot for a consistency group by using pre-fenced write requests. For example, the snapshot engine 106 may create a snapshot of volumes stored on primary storage devices (e.g., primary storage devices 130) based on write requests from an application (e.g., application 112) that were received (e.g., by a server system 110 or storage system 100) or issued before the request for the initiation or creation of the snapshot for the consistency group. As such, the pre-fenced write requests may be write requests issued by an application (e.g., application 112) before the request for the creation of a snapshot for a consistency group comprising the volumes associated with the write requests has been issued or received. Furthermore, the technique 400 may execute (at step 440) the fenced incoming write requests to the consistency group. For example, the snapshot engine 106 may unfence or no longer suspend the incoming write requests from an application (e.g., application 112) that were suspended or fenced at step 420. Thus, the write requests may be executed after the creation of the snapshot for the consistency group comprising the volumes associated with the write requests. In some embodiments, the write requests may be unfenced and thus executed after one or more logical interfaces have switched configuration states, as discussed in further detail below.

As such, a snapshot of a consistency group comprising one or more volumes may be created based on write requests to the one or more volumes of the consistency group. For example, when a snapshot request is initiated, write requests after the initiation of the snapshot request may be suspended or fenced until the snapshot has been created for each of the individual volumes or until the snapshot of the individual volume has been created (e.g., the snapshot for a first volume has finished and thus write requests to the first volume may no longer be suspended or fenced while write requests to a second volume may remain suspended until the snapshot for the second volume has completed). Thus, the snapshot of the consistency group may be performed based on write requests that were issued before the snapshot request. Further details with regard to the snapshot creation operation are disclosed below.

Figure 5:
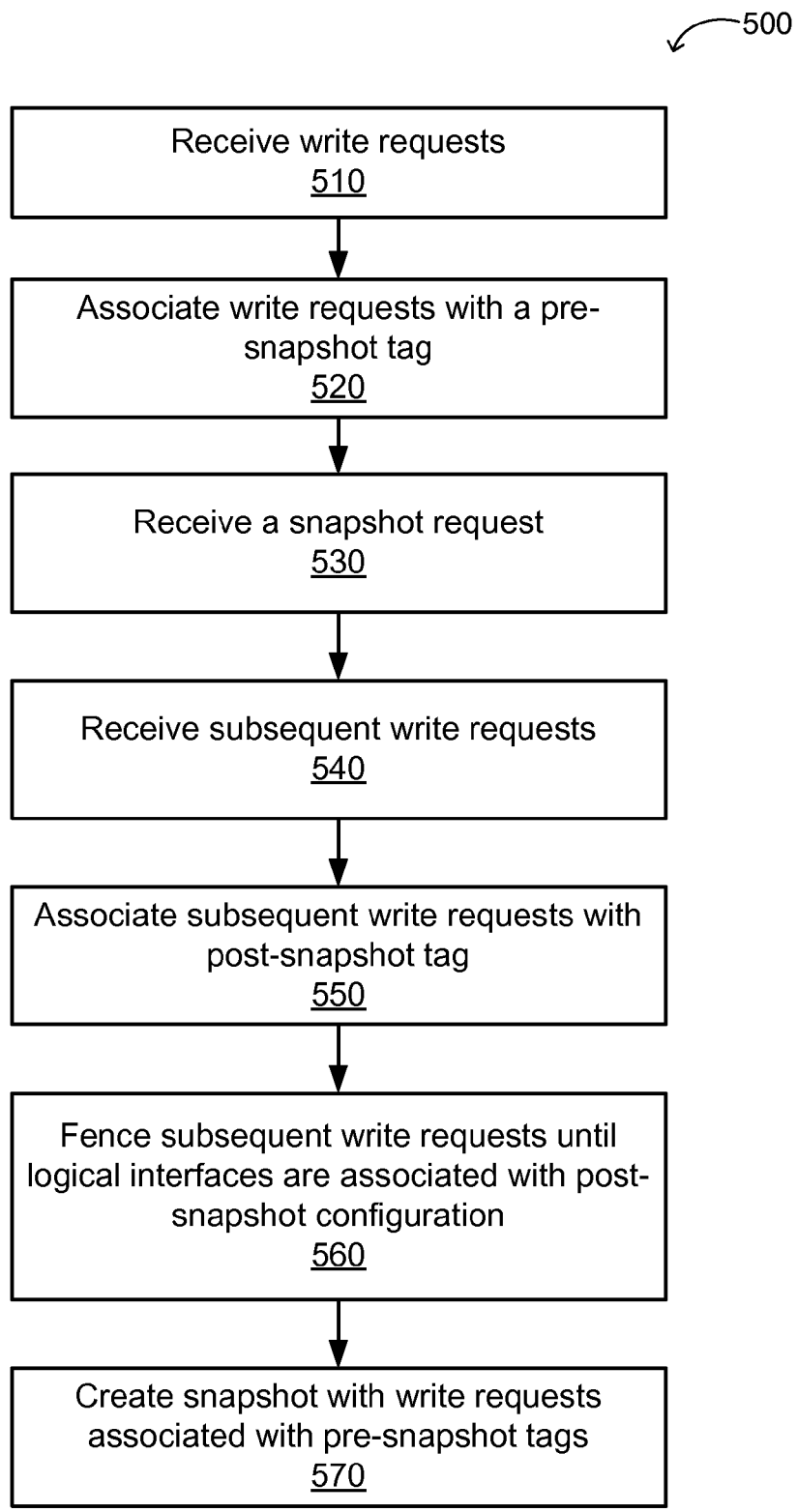
FIG. 5 is a flowchart of a technique to create a snapshot based on write requests associated with snapshot tags in which some embodiments operate.

FIG. 5 is a flowchart of a technique 500 to create a snapshot based on write requests associated with snapshot tags in which some embodiments operate. In general, the snapshot engine 106 may create a snapshot of a consistency group comprising one or more volumes stored on one or more primary storage devices (e.g., primary storage devices 130) based on a snapshot tag associated with write requests to the one or more volumes of the consistency group. In some embodiments, the storage system 100 and/or the snapshot engine 106 of the management server 105 may perform the technique 500. The technique 500 is described in relation to FIGS. 1-3, which conceptually illustrates the steps of the technique 500. In some embodiments, the technique 500 may create the snapshot from volumes stored on one or more primary storage devices with human initiation, interaction, or intervention. In some embodiments, particular steps of the technique 500 may be performed automatically, without human initiation, interaction, or intervention, while other steps of the technique 500 may be performed with human interaction. For example, in some embodiments, the steps of the technique 500 may be initiated when a user of an application (e.g., application 112) initiates a snapshot request or may be continuously operating.

In some embodiments, some of the steps of technique 500 are performed or caused to be performed by a storage operating system 301 of a storage system 100. The storage operating system 301 may be configured to operate in conjunction with other software modules of the storage system 100, server system 110, and software modules of the storage operating system 301 to collectively perform the embodiments described herein.

As shown in FIG. 5, the technique 500 may receive (at step 510) write requests. For example, an application (e.g., application 112) may issue a write request to modify a volume stored on a primary storage device (e.g., primary storage device 130). In some embodiments, the management server 105, snapshot engine 106, and/or storage system 100 may receive and/or identify a write request that has been issued by the application. Furthermore, the technique 500 may associate (at step 520) one or more write requests with a pre-snapshot tag. For example, the snapshot engine 106 may associate a write request issued by an application (e.g., application 112) with a pre-snapshot tag and record the association of the write request with the pre-snapshot tag by using a snapshot data structure 250. As such, write requests that have been issued by an application before a snapshot request has been initiated may be associated with and identified by a pre-snapshot tag. The technique 500 may further receive (at step 530) a snapshot request. For example, the snapshot engine 106 may receive a snapshot request from an application (e.g., application 112) or a user for a snapshot to be created for a consistency group comprising one or more volumes stored on one or more primary storage devices (e.g., primary storage devices 130).

As shown in FIG. 5, the technique 500 may receive (at step 540) one or more subsequent write requests. For example, an application (e.g., application 112) may issue another write request to modify a volume stored on a primary storage device (e.g., primary storage device 130). In some embodiments, the management server 105, snapshot engine 106, and/or storage system 100 may receive and/or identify the subsequent write request (e.g., a write request issued after the snapshot request at step 530) that has been issued by the application. The technique 500 may further associate (at step 550) the subsequent write requests with a post-snapshot tag. For example, the snapshot engine 106 may associate each write request issued by an application (e.g., application 112) after a snapshot request (e.g., from step 530) with a post-snapshot tag. In some embodiments, snapshot engine may associate a write request issued by an application after a snapshot request with a post-snapshot tag and record the association of the write request with the post-snapshot tag by using the snapshot data structure 250. As such, write requests that have been issued by an application after a snapshot request has been initiated may be associated with or identified by a post-snapshot tag. The technique 500 may further fence (at step 560) the subsequent write requests that are associated with a post-snapshot tag until one or more logical interfaces are associated with a post-snapshot configuration. For example, the snapshot engine 106 may suspend write requests issued by an application until one or more logical interfaces of a distributed or cluster storage system environment have switched from a pre-snapshot configuration to a post-snapshot configuration. In some embodiments, the logical interface may comprise an internet protocol (IP) cluster associated with one or more primary storage devices, storage servers, and/or server systems. For example, the logical interface may comprise one or more server systems, one or more storage systems, one or more networks, and/or one or more primary storage devices or any combination thereof. In some embodiments, each logical interface may be associated with a status or a bit (as further discussed below) to identify a pre-snapshot or post-snapshot status associated with the logical interface. For example, the logical interfaces may be associated with a pre-snapshot status or configuration before a snapshot request has been received or initiated such that write requests issued by the application before a snapshot request (e.g., from step 530) may be associated with a pre-snapshot tag. Furthermore, the logical interfaces may be associated with a post-snapshot status or configuration after a snapshot request has been received or initiated such that write requests issued by the application after a snapshot request (e.g., from step 530) may be associated with a post-snapshot tag. Finally, the technique 500 may create (at step 570) a snapshot of a consistency group by using the write requests that are associated with the pre-snapshot tags. As such, the snapshot of the consistency group is created without the write requests that are associated with a post-snapshot tag. In some embodiments, after the creation of the snapshot of the consistency group, the association of the write requests with the post-snapshot tag may be changed to an association with the pre-snapshot tag (e.g., the tags associated with the write requests may be changed from pre-snapshot to post-snapshot in response to the creation of the snapshot of the consistency group). For example, a subsequent write request may be received and associated with a post-snapshot tag. In response to the creation of the first snapshot of the consistency group, the subsequent write request may now be associated with a pre-snapshot tag. Thus, in response to a subsequent snapshot request, the subsequent snapshot may be created based on the subsequent write request (as well as previous write requests).

As such, write requests may be issued by an application. The write requests may be associated as pre-snapshot write requests or post-snapshot write requests. For example, write requests issued before a snapshot request may be associated with a pre-snapshot tag and write requests issued after a snapshot request may be associated with a post-snapshot tag. In some embodiments, write requests associated with a pre-snapshot tag have been executed to modify data blocks of a volume while write requests associated with a post-snapshot tag have been fenced or suspended such that the write request has not been executed to modify data blocks of a volume. The snapshot request may result in the creation of a snapshot of a consistency group comprising volumes that reflect the write requests associated with the pre-snapshot tag and does not reflect the write requests associated with a post-snapshot tag. In some embodiments, the write requests associated with a post-snapshot tag are suspended or prevented from being executed to modify data blocks of a volume until each logical interface has changed or flipped its configuration from pre-snapshot to post-snapshot, as further described below. Thus, the snapshot of a consistency group comprising one or more volumes may be created based on or from write requests to the one or more volumes that are also associated with a pre-snapshot tag.

Figure 6:
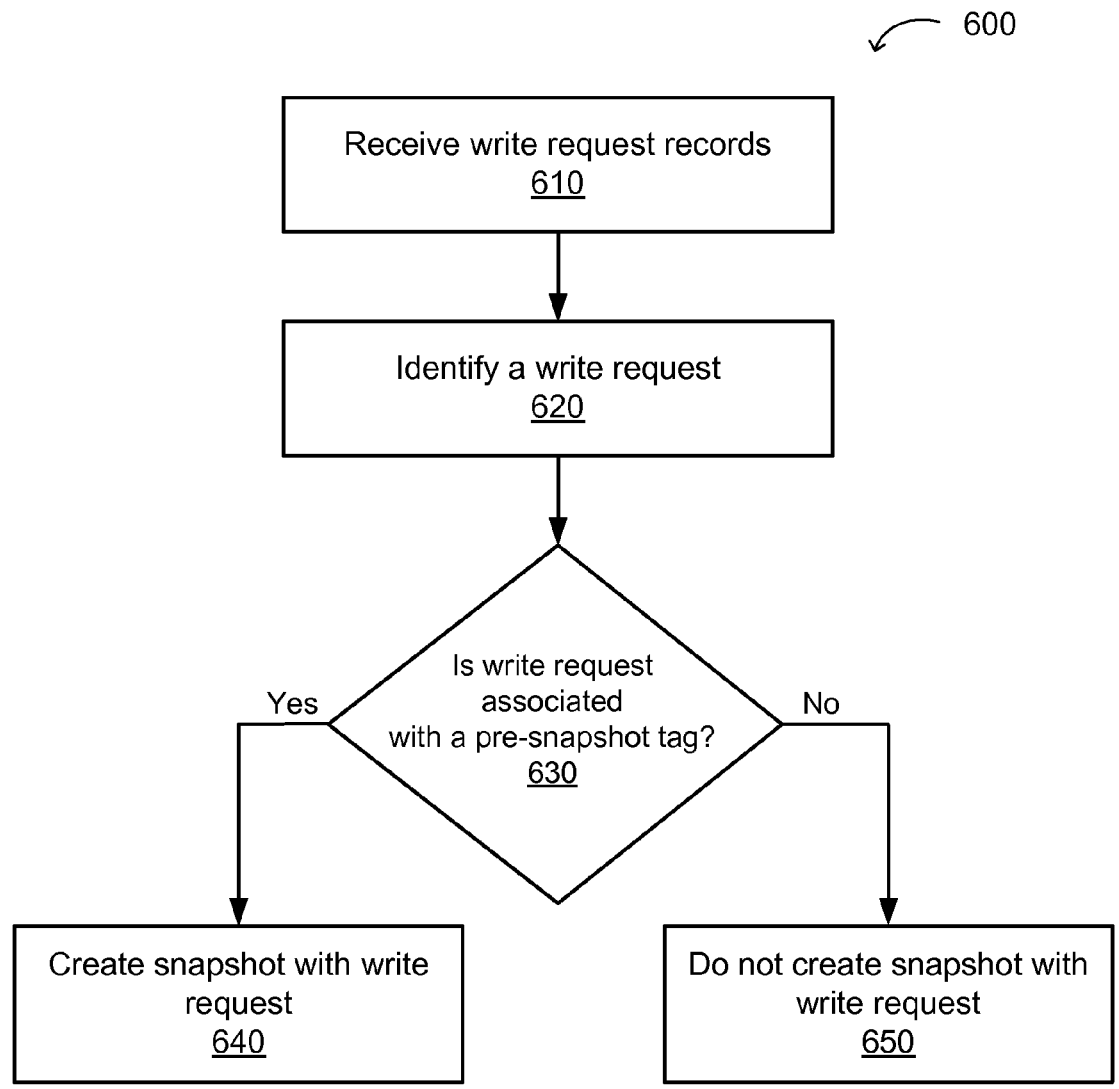
FIG. 6 is a flowchart of a technique to create a snapshot based on write requests associated with pre-snapshot tags in which some embodiments operate.

FIG. 6 is a flowchart of a technique 600 to create a snapshot based on write requests associated with pre-snapshot tags in which some embodiments operate. In general, the snapshot engine 106 may create a snapshot of a consistency group comprising one or more volumes stored on one or more primary storage devices (e.g., primary storage devices 130) based on write requests to the one or more volumes that are also associated with a pre-snapshot tag. In some embodiments, the storage system 100 and/or the snapshot engine 106 of the management server 105 may perform the technique 600. The technique 600 is described in relation to FIGS. 1-3, which conceptually illustrates the steps of the technique 600. In some embodiments, the technique 600 may create the snapshot from volumes stored on one or more primary storage devices with human initiation, interaction, or intervention. In some embodiments, particular steps of the technique 600 may be performed automatically, without human initiation, interaction, or intervention, while other steps of the technique 600 may be performed with human interaction. For example, in some embodiments, the steps of the technique 600 may be initiated when a user of an application (e.g., application 112) initiates a snapshot request or may be continuously operating.

As shown in FIG. 6, the technique 600 may receive (at step 610) write request records or data structure (e.g., snapshot data structure 250). For example, the snapshot engine 106 may receive a write request log or snapshot data structure 250 comprising a record of write requests issued by an application 112. The method 600 may further identify (at step 620) a write request from the received write request record. For example, the snapshot engine 106 may identify a first write request and a second write request that has been issued by the application 112. In some embodiments, each of the write requests from the write request record may be associated with a tag. For example, the first write request may be associated with a pre-snapshot tag and the second write request may be associated with a post-snapshot tag. The method 600 may determine (at step 630) if the previously identified write request is associated with a pre-snapshot tag or a post-snapshot tag. If the write is associated with a pre-snapshot tag, then the method may create (at step 640) a snapshot of a consistency group comprising volumes that reflect the write request with the pre-snapshot tag. However, if the write record is not associated with a pre-snapshot tag and is instead associated with a post-snapshot tag, then the technique 600 may not create (at step 650) the snapshot of the consistency group comprising volumes that reflect the write request associated with the post-snapshot tag. As such, a snapshot of a consistency group comprising one or more volumes may be created based on write requests associated with a pre-snapshot tag and write requests associated with a post-snapshot tag may be excluded from the snapshot of the volumes comprising the consistency group.

Figure 7:
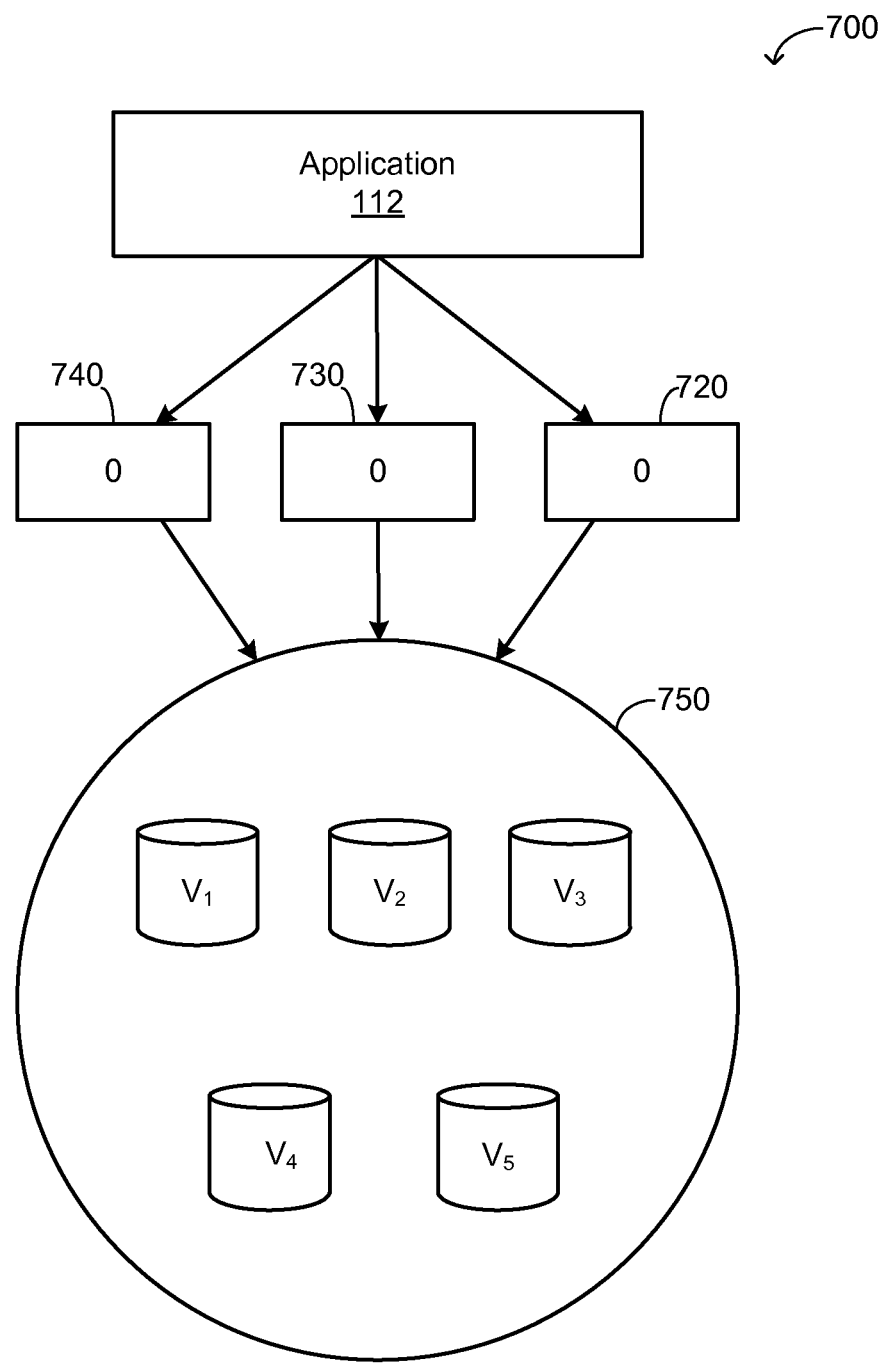
FIG. 7 is a block diagram of a storage system environment with logical interfaces in a pre-snapshot configuration in accordance with some embodiments.

FIG. 7 is a block diagram of a storage system environment 700 comprising logical interfaces in a pre-snapshot configuration in accordance with some embodiments. In general, the storage system environment 700 may comprise one or more logical interfaces that are associated with a configuration state. In some embodiments, the snapshot engine 106 may manage and/or change the configuration state of the logical interfaces.

As shown in FIG. 7, the storage system environment 700 may comprise an application. For example, the storage system environment 700 may comprise an application 112 running on a server system 110. In some embodiments, the application 112 may issue one or more write requests. For example, the application 112 may issue one or more write requests to write data to one or more volumes that together constitute a consistency group 750. As such, the application 112 may issue write requests to modify data of volumes that make up a consistency group. In some embodiments, the storage system environment 700 may comprise a plurality of logical interfaces. For example, the storage system environment 700 may comprise a logical interface 740, logical interface 730, and logical interface 720. In some embodiments, write requests issued from the application to modify data of a volume of the consistency group 750 may pass through at least one of the logical interfaces 720, 730, or 740 or any combination of the logical interfaces 720, 730, or 740. For example, a first write request issued from the application 112 to a first volume may have to pass through logical interface 740, a second write request issued from the application 112 to a second volume may have to pass through the logical interface 730, and a third write request issued from the application 112 to a third volume may have to pass through logical interface 720. As shown in FIG. 7, each of the logical interfaces 720, 730, and 740 may be associated with a bit (e.g., a number '0'). In some embodiments, the bits associated with the logical interfaces 720, 730, and 740 may indicate or determine a configuration status for each of the logical interfaces 720, 730, and 740. For example, when the bit for any of the logical interfaces 720, 730, or 740 is set to '0', the configuration state of the corresponding logical interface may be a pre-snapshot configuration. In some embodiments, when the logical interface is in a pre-snapshot configuration state, then any write request issued by the application 112 to modify data of a volume that is part of the consistency group 750 that passes through one of the logical interfaces 720, 730, or 740 may be associated with a pre-snapshot tag.

Figure 8:
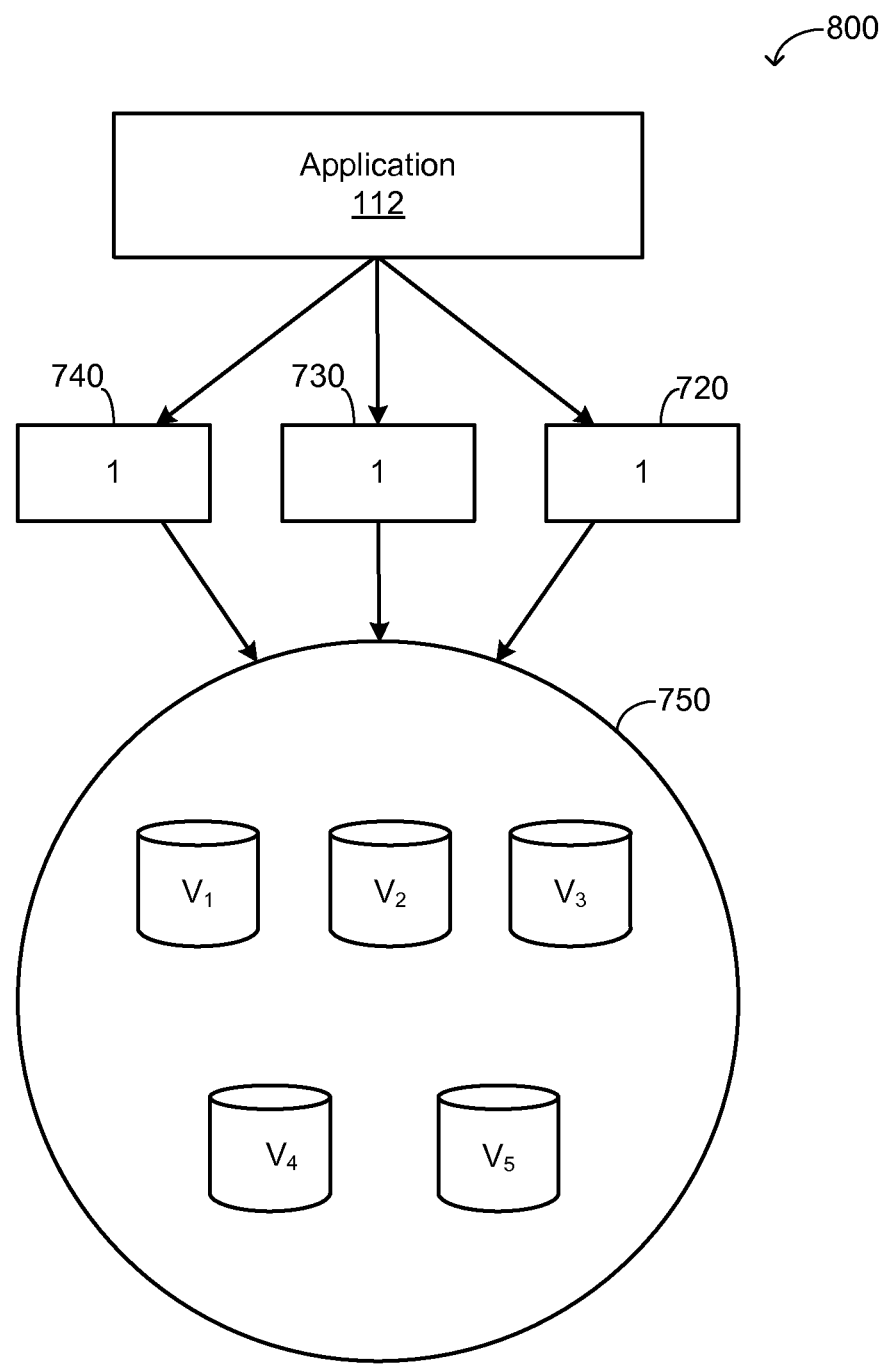
FIG. 8 is a block diagram of a storage system environment with logical interfaces in a post-snapshot configuration in accordance with some embodiments.

FIG. 8 is a block diagram of a storage system environment 800 comprising logical interfaces in a post-snapshot configuration in accordance with some embodiments. In general, the storage system environment 800 is similar to the storage system environment 700, but the logical interfaces have been changed or flipped to a post-snapshot configuration state. For example, the snapshot engine 106 may change or flip the configuration state of each of the logical interfaces of the storage system environment.

As shown in FIG. 8, the storage system environment 800 may comprise the application 112 issuing write requests to volumes of a consistency group 750. Furthermore, the storage system environment may also comprise the logical interfaces 720, 730, and 740. As previously discussed, any write requests issued by the application 112 to modify data of the volumes of the consistency group 750 may pass through at least one of the logical interfaces 720, 730, or 740. Furthermore, the logical interfaces 720, 730, and 740 may associate a tag (e.g., a pre-snapshot tag or a post-snapshot tag) to the write requests from the application 112. In some embodiments, each of the logical interfaces may have been configured by the snapshot engine 112 to change, switch, or flip a bit (e.g., from '0' to '1') or configuration state (e.g., from pre-snapshot to post-snapshot). As such, each of the logical interfaces 720, 730, and 740 may be changed or configured to a post-snapshot configuration. Thus, each write request from the application 112 may be associated with a post-snapshot tag if the logical interface has been configured to a post-snapshot configuration.

As previously discussed, write requests associated with a post-snapshot tag may be fenced or suspended until all of the associated logical interfaces have been switched or flipped from a pre-snapshot configuration to a post-snapshot configuration. For example, as shown in FIG. 8, each of the logical interfaces 720, 730, and 740 are associated with a '1' to indicate a post-snapshot configuration. In some embodiments, any write request issued from the application 112 may be fenced or suspended (i.e., not executed) until each of the logical interfaces 720, 730, and 740 have been switched to a post-snapshot configuration. For example, if the logical interface 720 and the logical interface 730 have been switched to a post-snapshot configuration (e.g., a bit value of '1'), but the logical interface 740 has not yet been switched to a post-snapshot configuration (e.g., the logical interface 740 is still at a bit value of '0' to indicate a pre-snapshot configuration), then any write requests from the application 112 that are associated with a post-snapshot tag may not be executed. However, when the logical interface 740 has been switched to a post-snapshot configuration (e.g., a bit value of '1'), then the write requests from the application 112 that are associated with a post-snapshot tag may then be executed (e.g., data may be written to the volumes of the consistency group 750).

Figure 9:
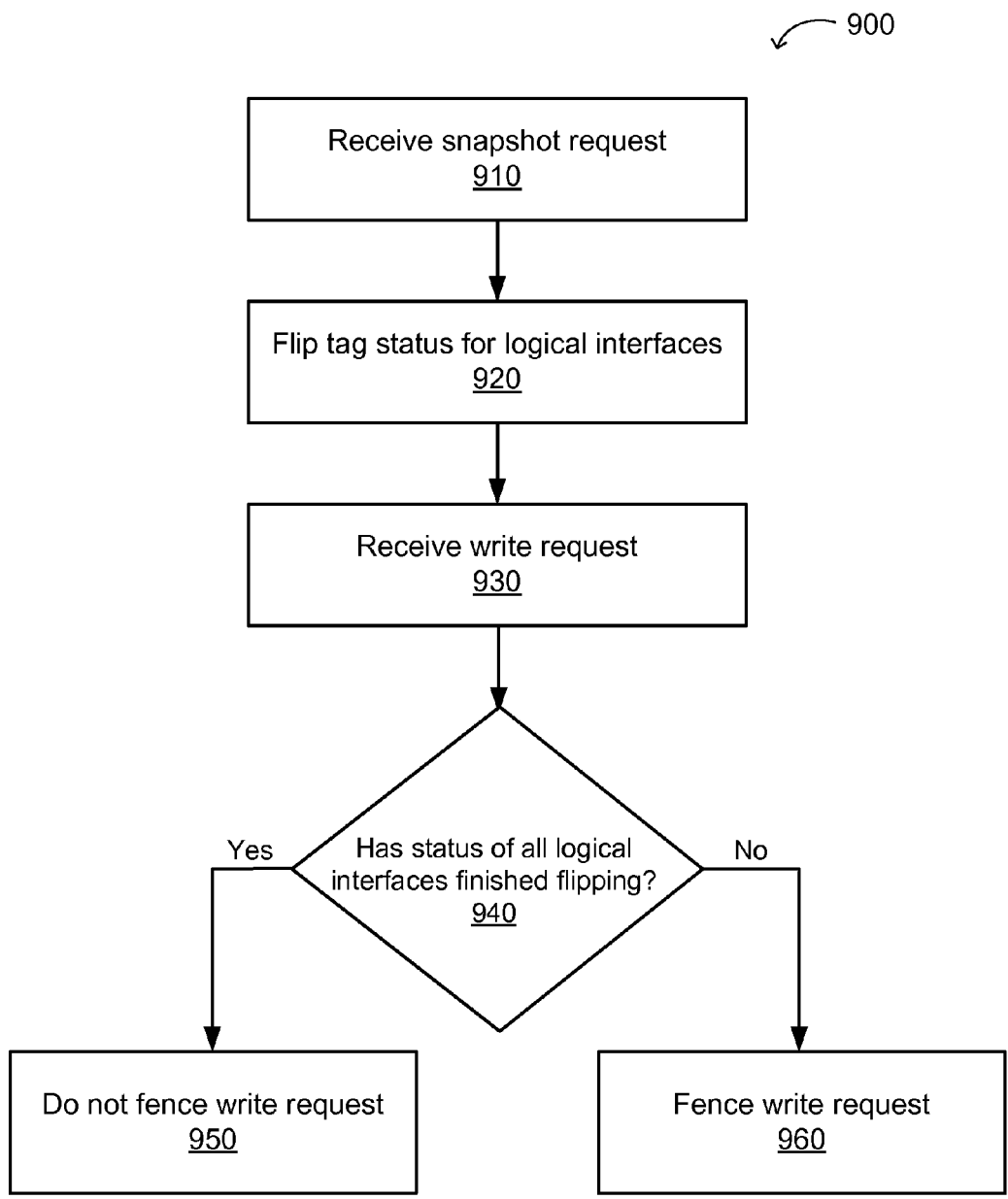
FIG. 9 is a flowchart of a technique to fence write request based on a configuration of logical interfaces in which some embodiments operate.

FIG. 9 is a flowchart of a technique 900 to fence write requests based on a configuration of logical interfaces in which some embodiments operate. In general, the snapshot engine 106 may fence or suspend write requests associated with a post-snapshot tag until one or more logical interfaces have switched or flipped configuration or status from pre-snapshot to post-snapshot. In some embodiments, the storage system 100 and/or the snapshot engine 106 of the management server 105 may perform the technique 900. The technique 900 is described in relation to FIGS. 1-3, which conceptually illustrates the steps of the technique 900. In some embodiments, the technique 900 may create the snapshot from volumes stored on one or more primary storage devices with human initiation, interaction, or intervention. In some embodiments, particular steps of the technique 900 may be performed automatically, without human initiation, interaction, or intervention, while other steps of the technique 900 may be performed with human interaction. For example, in some embodiments, the steps of the technique 900 may be initiated when a user of an application (e.g., application 112) initiates a snapshot request.

As shown in FIG. 9, the technique 900 may receive (at step 910) a snapshot request. For example, the snapshot engine 106 may receive a request from a user of an application 112 to perform a snapshot operation of a consistency group comprising one or more volumes stored on one or more primary storage devices 130. The technique 900 may further flip or change (at step 920) a status or configuration associated with logical interfaces. For example, the configuration of the logical interfaces may be changed from a pre-snapshot configuration or status to a post-snapshot configuration or status. In some embodiments, the switching of the configuration of the logical interface may be in response to the receiving of a snapshot request. In the same or alternative embodiments, write requests that are received or transmitted through a logical interface with a pre-snapshot configuration or status may be associated with a pre-snapshot tag. In the same or alternative embodiments, write requests that are received or transmitted through a logical interface with a post-snapshot configuration or status may be associated with a post-snapshot tag. As such, the flipping or changing of the configuration or status of a logical interface may change the tag associated with incoming write requests from pre-snapshot tags to post-snapshot tags. Furthermore, the technique 900 may receive (at step 930) a write request. For example, the snapshot engine 106 may receive a write request issued from an application. In some embodiments, the write request may comprise a write request that is associated with a post-snapshot tag. Next, the technique 900 may determine (at step 940) whether the status or configuration of all of the logical interfaces have finished switching or flipping from a pre-snapshot configuration to a post-snapshot configuration. For example, if all of the logical interfaces have switched or flipped from a pre-snapshot configuration to a post-snapshot configuration, then the method 900 may not or may no longer fence or suspend (at step 950) write requests that are associated with a post-snapshot tag. However, if the technique 900 determines that at least one logical interface has not had its associated configuration or status switched from pre-snapshot to post-snapshot, then all of the write requests associated with a post-snapshot tag may still be suspended (at step 960) and prevented from executing.

As such, write requests associated with a post-snapshot tag may be suspended or fenced until a configuration of each of the logical interfaces has switched from a pre-snapshot configuration to a post-snapshot configuration. In some embodiments, once each of the logical interfaces has switched to a post-snapshot configuration, then the write requests associated with the post-snapshot tag may no longer be suspended and may thus be executed to modify data blocks of volumes associated with the write requests. In the same or alternative embodiments, write requests associated with a pre-snapshot tag may have already been executed and not subjected to a suspension or fencing.

Figure 10:
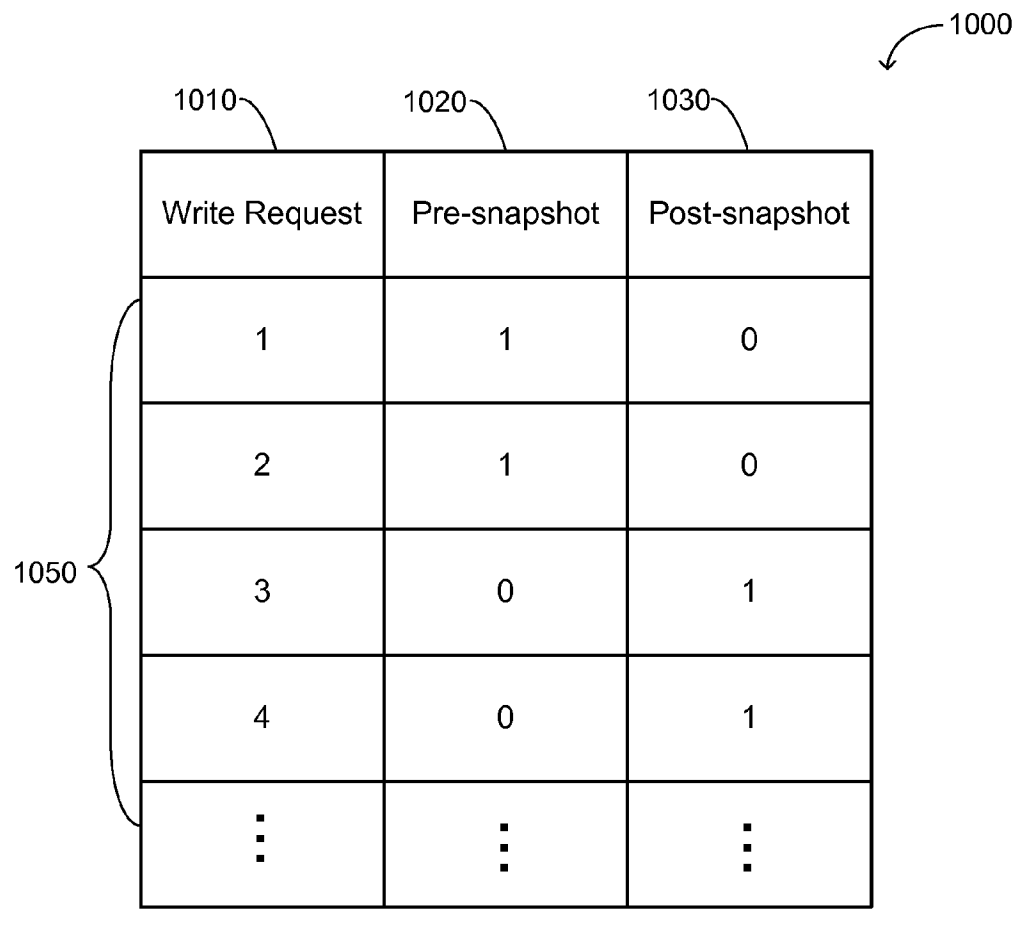

FIG. 10 shows an exemplary snapshot data structure in accordance with some embodiments. In general, the snapshot data structure 1000 may be used by a snapshot engine 106 to create a snapshot of a consistency group (e.g., consistency group 750) comprising one or more volumes stored on one or more primary storage devices (e.g., primary storage devices 130).

In some embodiments, the snapshot data structure 1000 may identify a tag associated with one or more write requests issued by an application (e.g., application 112). The snapshot data structure 1000 may be constructed and maintained to associate write requests with a snapshot tag. For example, the snapshot engine 106 may construct and maintain the snapshot data structure 1000 and/or use the snapshot data structure 1000 to create a snapshot and to fence or suspend write requests.

As shown in FIG. 10, the snapshot data structure 1000 comprises a plurality of dataset entries 1050, each dataset entry 1050 representing a write request identifier. Each dataset entry 1050 may comprise a plurality of data fields for storing data describing a corresponding write request.

In some embodiments, a dataset entry 1050 may represent a write request from an application 112 and may contain data fields for a write request identifier 1010, pre-snapshot tag identifier 1020, and a post-snapshot tag identifier 1030. The write request identifier 1010 may comprise information identifying a specific write request that has been issued by an application. For example, the write request identifier 1010 may comprise a name or number of a write request. As such, the write request identifier 1010 may identify write requests that have been issued by an application.

The pre-snapshot tag identifier 1020 may indicate whether a corresponding write request as identified by the write request identifier 1010 is associated with a pre-snapshot tag. For example, if a write request is associated with a pre-snapshot tag, then the corresponding pre-snapshot tag identifier 1020 data field for the write request may indicate a value of '1.' However, if the write request is not associated with a pre-snapshot tag, then the corresponding pre-snapshot tag identifier 1020 data field for the write request may indicate a value of '0.'

The post-snapshot tag identifier 1030 may indicate whether a corresponding write request as identified by the write request identifier 1010 is associated with a post-snapshot tag. For example, if a write request is associated with a post-snapshot tag, then the corresponding post-snapshot tag identifier 1030 data field for the write request may indicate a value of '1.' However, if the write request is not associated with a post-snapshot tag, then the corresponding post-snapshot tag identifier 1030 data field for the write request may indicate a value of '0.' In some embodiments, each write request from the write request identifier 1010 data fields must be associated with only one of a pre-snapshot tag or a post-snapshot tag. As such, only one of the pre-snapshot tag identifier or the post-snapshot tag identifier for each write request may indicate a value of '1.'

In some embodiments, the write request identifier field 1010, pre-snapshot tag identifier 1020, and post-snapshot tag identifier 1030 may be generated or received when a write request is issued from an application or when a snapshot creation request has been received. For example, the snapshot data structure 1000 may be updated whenever a write request has been issued and/or whenever a snapshot creation request for a consistency group is received.

Various Embodiments

Some embodiments may be conveniently implemented using a conventional general purpose or a specialized digital computer or microprocessor programmed according to the teachings herein, as will be apparent to those skilled in the computer art. Some embodiments may be implemented by a general purpose computer programmed to perform method or process steps described herein. Such programming may produce a new machine or special purpose computer for performing particular method or process steps and functions (described herein) pursuant to instructions from program software. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information may be represented using any of a variety of different technologies and techniques.

Some embodiments include a computer program product comprising a computer readable medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a non-transitory computer readable medium. The computer readable medium may comprise a storage medium having instructions stored thereon in which may be used to control, or cause, a computer to perform any of the processes of an embodiment. The storage medium may include, without limitation, any type of device including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those of skill would further appreciate that the various illustrative logical blocks, circuits, modules, algorithms, techniques, processes, or method steps of embodiments described herein may be implemented as computer electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The algorithm, techniques, processes, or methods described in connection with embodiments disclosed herein may be embodied directly in hardware, in software executed by a processor, or in a combination of the two. In some embodiments, any software application, program, tool, module, or layer described herein may comprise an engine comprising hardware and/or software configured to perform embodiments described herein. In general, functions of a software application, program, tool, module, or layer described herein may be embodied directly in hardware, or embodied as software executed by a processor, or embodied as a combination of the two. A software application, layer, or module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

What is claimed is:

1. A method comprising:
    configuring a logical interface to have a pre-snapshot configuration indicating that the logical interface is to tag write requests with a pre-snapshot, wherein a write request is an I/O operation targeting a storage object, and wherein the I/O operation, but not the storage object, is to be tagged;
    receiving a first set of write requests to modify data of a volume of a consistency group, wherein each write request of the first set of write requests is tagged by the logical interface with the pre-snapshot tag based upon the logical interface having the pre-snapshot configuration;
    receiving a snapshot create request to create a snapshot of the consistency group;
    responsive to receiving the snapshot create request, configuring the logical interface to have a post-snapshot configuration indicating that the logical interface is to tag write requests with a post-snapshot tag, wherein the pre-snapshot tag and the post-snapshot tag comprise bit values;
    receiving a second set of write requests to modify data of the volume of the consistency group, wherein each write request of the second set of write requests is tagged by the logical interface with the post-snapshot tag based upon the logical interface having the post-snapshot configuration; and
    implementing the snapshot create request to create the snapshot of the consistency group, wherein the first set of write requests are utilized to create the snapshot based upon the pre-snapshot tag and the second set of write requests are not utilized to create the snapshot based upon the post-snapshot tag.

2. The method of claim 1, comprising: responsive to the snapshot being created, configuring the logical interface with the pre-snapshot configuration.

3. The method of claim 1, wherein the configuring a logical interface to have a pre-snapshot configuration comprises:
    changing a bit associated with the logical interface to a pre-snapshot configuration bit value.

4. The method of claim 1, wherein the configuring the logical interface to have a post-snapshot configuration comprises:
    changing a bit associated with the logical interface to a post-snapshot configuration bit value.

5. The method of claim 1, wherein the first logical interface and a second logical interface are configured to receive and tag write requests, and wherein the method comprises:
 suspending write requests tagged with the post-snapshot tag, but not write requests tagged with the pre-snapshot tag, until both the logical interface and the second logical interface have been configured to have the post-snapshot configuration in response to receiving the snapshot create request.

6. The method of claim 1, comprising: responsive to the snapshot being created, switching the second set of write requests from having the post-snapshot tag to having the pre-snapshot tag.

7. The method of claim 1, comprising:
 executing a write request, having the post-snapshot tag, when the logical interface has been switched from the pre-snapshot configuration to the post-snapshot configuration.

8. The method of claim 1, wherein the storage object is a file.

9. The method of claim 1, comprising: maintaining a snapshot data structure comprising a plurality of dataset entries that associate the pre-snapshot tag and the post-snapshot tag with write requests.

10. The method of claim 9, wherein the maintaining a snapshot data structure comprises:
 populating a dataset entry of the snapshot data structure with a write request identifier of a write request, a pre-snapshot tag identifier having a pre-snapshot field set to indicate whether the write request has or has not been tagged with the pre-snapshot tag, and a post-snapshot tag identifier having a post-snapshot field set to indicate whether the write request has or has not been tagged with the post-snapshot tag.

11. The method of claim 10, wherein the write request identifier comprises a name of the write request.

12. The method of claim 10, wherein the write request identifier comprises a number of the write request.

13. The method of claim 9, comprising: updating the snapshot data structure when a new write request is issued by an application.

14. The method of claim 9, comprising: updating the snapshot data structure when the snapshot create request is received.

15. The method of claim 1, wherein the logical interface is associated with an internet protocol address of a data path to a storage device.

16. The method of claim 1, wherein the logical interface is an internet protocol cluster.

17. A computing device comprising:
 a memory containing a non-transitory machine readable medium comprising machine executable code having stored thereon instructions for performing a method; and
 a processor coupled to the memory, the processor configured to execute the machine executable code to cause the processor to:
 configure a logical interface to have a pre-snapshot configuration indicating that the logical interface is to tag write requests with a pre-snapshot tag, wherein a write request is an I/O operation targeting a storage object, and wherein the I/O operation, but not the storage object, is to be tagged;
 receive a first set of write requests to modify data of a volume of a consistency group, wherein each write request of the first set of write requests is tagged by the logical interface with the pre-snapshot tag based upon the logical interface having the pre-snapshot configuration;
 receive a snapshot create request to create a snapshot of the consistency group;
 responsive to receiving the snapshot create request, configure the logical interface to have a post-snapshot configuration indicating that the logical interface is to tag write requests with a post-snapshot tag, wherein the pre-snapshot tag and the post-snapshot tag comprise bit values;
 receive a second set of write requests to modify data of the volume of the consistency group, wherein each write request of the second set of write requests is tagged by the logical interface with the post-snapshot tag based upon the logical interface having the post-snapshot configuration; and
 implement the snapshot create request to create the snapshot of the consistency group, wherein the first set of write requests are utilized to create the snapshot based upon the pre-snapshot tag and the second set of write requests are not utilized to create the snapshot based upon the post-snapshot tag.

18. The computing device of claim 17, wherein the machine executable code causes the processor to:
 responsive to the snapshot being created, configure the logical interface with the pre-snapshot configuration.

19. The computing device of claim 17, wherein the configuring a logical interface to have a pre-snapshot configuration comprises:
 change a bit associated with the logical interface to a pre-snapshot configuration bit value.

20. The computing device of claim 17, wherein the configuring the logical interface to have a post-snapshot configuration comprises:
 change a bit associated with the logical interface to a post-snapshot configuration bit value.

21. The computing device of claim 17, wherein the first logical interface and a second logical interface are configured to receive write requests, and wherein the method comprises:
 suspend write requests tagged with the post-snapshot tag, but not write requests tagged with the pre-snapshot tag, until both the logical interface and the second logical interface have been configured to have the post-snapshot configuration in response to receiving the snapshot create request.

22. The computing device of claim 17, wherein the machine executable code causes the processor to:
 responsive to the snapshot being created, switch the second set of write requests from having the post-snapshot tag to having the pre-snapshot tag.

23. The computing device of claim 17, wherein the machine executable code causes the processor to:
 execute a write request, having the post-snapshot tag, when the logical interface has been switched from the pre-snapshot configuration to the post-snapshot configuration.

24. The computing device of claim 17, wherein the machine executable code causes the processor to:
 maintain a snapshot data structure comprising a plurality of dataset entries that associate the pre-snapshot tag and the post-snapshot tag with write requests; and
 populate a dataset entry of the snapshot data structure with a write request identifier of a write request, a pre-snapshot tag identifier having a pre-snapshot field set to indicate whether the write request has or has not been tagged with the pre-snapshot tag, and a post-snapshot tag identifier having a post-snapshot field set to indicate whether the write request has or has not been tagged with the post-snapshot tag.

25. A non-transitory machine readable medium having stored thereon instructions for performing a method comprising machine executable code which when executed by at least one machine, causes the machine to:

configure a logical interface to have a pre-snapshot configuration indicating that the logical interface is to tag write requests with a pre-snapshot tag, wherein a write request is an I/O operation targeting a storage object, and wherein the I/O operation, but not the storage object, is to be tagged;

receive a first set of write requests to modify data of a volume of a consistency group, wherein each write request of the first set of write requests is tagged by the logical interface with the pre-snapshot tag based upon the logical interface having the pre-snapshot configuration;

receive a snapshot create request to create a snapshot of the consistency group;

responsive to receiving the snapshot create request, configure the logical interface to have a post-snapshot configuration indicating that the logical interface is to tag write requests with a post-snapshot tag, wherein the pre-snapshot tag and the post-snapshot tag comprise bit values;

receive a second set of write requests to modify data of the volume of the consistency group, wherein each write request of the second set of write requests is tagged by the logical interface with the post-snapshot tag based upon the logical interface having the post-snapshot configuration; and implement the snapshot create request to create the snapshot of the consistency group, wherein the first set of write requests are utilized to create the snapshot based upon the pre-snapshot tag and the second set of write requests are not utilized to create the snapshot based upon the post-snapshot tag.

* * * * *